United States Patent
Agassy et al.

(10) Patent No.: US 12,032,667 B2
(45) Date of Patent: *Jul. 9, 2024

(54) APPARATUS AND METHOD FOR DEVICE SECURITY

(71) Applicant: QUALCOMM Incorporated, San Diego, CA (US)

(72) Inventors: Meir Agassy, Ramat Gan (IL); Noam Dagan, Binyamina (IL); Gal Rotem, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,425

(22) Filed: Dec. 2, 2021

(65) Prior Publication Data

US 2022/0092160 A1    Mar. 24, 2022

Related U.S. Application Data

(63) Continuation of application No. 16/899,356, filed on Jun. 11, 2020, now Pat. No. 11,204,990, which is a
(Continued)

(51) Int. Cl.
*G06F 21/32* (2013.01)
*G06F 3/041* (2006.01)
(Continued)

(52) U.S. Cl.
CPC ............ *G06F 21/32* (2013.01); *G06F 3/0416* (2013.01); *G06F 3/04883* (2013.01); *G06V 40/1306* (2022.01); *G06V 40/1347* (2022.01);

*G06V 40/1365* (2022.01); *H04L 9/3231* (2013.01); *H04L 63/0861* (2013.01);
(Continued)

(58) Field of Classification Search
CPC .... G06F 21/32; G06F 3/0416; G06F 3/04883; G06F 2221/2113; G06F 2221/2139; G06F 2221/2151; G06V 40/1306; G06V 40/1347; G06V 40/1365; H04L 9/3231; H04L 63/0861

See application file for complete search history.

(56) References Cited

U.S. PATENT DOCUMENTS 9,666,000 B1    5/2017    Schoenfelder et al.
10,691,781 B2   6/2020    Agassy et al.
(Continued)

OTHER PUBLICATIONS

International Search Report and Written Opinion—PCT/US2018/055243—ISA/EPO—Dec. 13, 2018.
(Continued)

*Primary Examiner* — Qian Yang
(74) *Attorney, Agent, or Firm* — QUALCOMM Incorporated (57) ABSTRACT

An apparatus and method for device security, wherein a fingerprint image is acquired on a touchscreen, and an authentication process is performed based on the first fingerprint image. Thereafter, a second fingerprint image is acquired and a difference between a characteristic of the first and second fingerprint images is determined, and based upon whether this difference is greater than a threshold, a second authentication process is performed.

23 Claims, 8 Drawing Sheets

Related U.S. Application Data continuation of application No. 15/798,327, filed on Oct. 30, 2017, now Pat. No. 10,691,781.

(51) Int. Cl.
*G06F 3/04883* (2022.01)
*G06V 40/12* (2022.01)
*G06V 40/13* (2022.01)
*H04L 9/32* (2006.01)
*H04L 9/40* (2022.01)

(52) U.S. Cl.
CPC ............... *G06F 2221/2113* (2013.01); *G06F 2221/2139* (2013.01); *G06F 2221/2151* (2013.01)

(56) References Cited

U.S. PATENT DOCUMENTS

| | | | |
|---|---|---|---|
| 11,204,990 B2 | 12/2021 | Agassy et al. | |
| 2004/0255168 A1* | 12/2004 | Murashita | G07C 9/257 726/5 |
| 2008/0085039 A1 | 4/2008 | Moon et al. | |
| 2008/0092245 A1 | 4/2008 | Alward et al. | |
| 2012/0032782 A1 | 2/2012 | Colella | |
| 2013/0298224 A1 | 11/2013 | Heilpern et al. | |
| 2014/0176332 A1 | 6/2014 | Alameh et al. | |
| 2015/0043792 A1 | 2/2015 | Nada et al. | |
| 2015/0356286 A1 | 12/2015 | Quirk et al. | |
| 2016/0063230 A1 | 3/2016 | Alten | |
| 2016/0271280 A1 | 9/2016 | Liao et al. | |
| 2017/0147865 A1 | 5/2017 | Jensen et al. | |
| 2017/0330020 A1 | 11/2017 | Tuneld et al. | |
| 2017/0344734 A1 | 11/2017 | Zhou | |
| 2017/0344795 A1 | 11/2017 | Zhou | |
| 2018/0082102 A1 | 3/2018 | Lee et al. | |
| 2018/0293370 A1 | 10/2018 | Kim et al. | |
| 2019/0130083 A1 | 5/2019 | Agassy et al. | |
| 2020/0302044 A1 | 9/2020 | Agassy et al. | |

OTHER PUBLICATIONS

International Preliminary Report on Patentability—PCT/US2018/055243, The International Bureau of WIPO—Geneva, Switzerland, May 14, 2020.

Roy A., et al. "MasterPrint: Exploring the Vulnerability of Partial Fingerprint-Based Authentication Systems", IEEE Transactions on Information Forensics and Security, vol. 12, No. 9, Sep. 2017, pp. 2013-2025.

* cited by examiner

APPARATUS AND METHOD FOR DEVICE SECURITY

CROSS-REFERENCE TO RELATED APPLICATION(S)

The present Application is a continuation of U.S. application Ser. No. 16/899,356 entitled "APPARATUS AND METHOD FOR DEVICE SECURITY," filed Jun. 11, 2020, which is a continuation of U.S. application Ser. No. 15/798,327 entitled "APPARATUS AND METHOD FOR DEVICE SECURITY," filed Oct. 30, 2017, both of which are assigned to the assignee hereof.

FIELD

This disclosure relates generally to an apparatus and method for enabling an authorized user to operate a device and access data.

BACKGROUND

In a device with a fingerprint sensor, a fingerprint sensor may be used to authenticate a user. An authentication process may enable access to data or functions not otherwise available to an unauthorized user.

The fingerprint sensor may reside, for example, underneath a touchscreen and capable of sensing touch on the entire screen. The fingerprint sensor may also reside only under a portion of a touchscreen. The fingerprint sensor may also reside at the back, or sides, or on a button of a device. The fingerprint sensor may be operatively coupled to other components in a device, such as a processor or a touchscreen. The fingerprint sensor may also be integrated with, or function as, the touch screen of a device.

In conventional devices with fingerprint sensors, a user places their finger on the fingerprint sensor and their fingerprint is authenticated once and then is able to access certain data or functions of the device. Typically, the device provides a timeout function for disabling access once the device has not been interacted with for a period of time. After the device times out, a user must reauthenticate in order to access certain data or functions.

The timeout period may be adjustable by a user, and, for example, a user desiring to not frequently authenticate may set the timeout period to 10 minutes or more.

One disadvantage of this technique is that a user may be authenticated with a device, and a second, unauthorized user, may access the device as if they were the authorized user as long as they do so before the device times out.

One solution to the aforementioned disadvantage is to continually authenticate the fingerprint of the user as they use the device. However, the downside to continuous authentication is twofold—it consumes more power and, because a full fingerprint authentication process has an associated latency, it may negatively impact user experience.

Therefore there exists a need for a power efficient, low-latency authentication process which provides additional security over a process which relies on a timeout.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a touch-sensitive surface, one or more processors, and a fingerprint sensor. The fingerprint sensor may be configured to acquire a first fingerprint image at an area proximate a first location of contact on the touch-sensitive surface and a second fingerprint image at an area proximate a second location of contact on the touch-sensitive surface. The one or more processors may be configured to perform an authentication process based on the first fingerprint image, determine a difference between a characteristic of the second fingerprint image and the first fingerprint image, and to perform a second authentication process based upon whether the difference between the characteristic of the second fingerprint image and the characteristic of the first fingerprint image is greater than a threshold.

In some aspects, a method for authenticating may comprise acquiring a first fingerprint image at an area proximate a first location of contact on a touch-sensitive surface, performing an authentication process based on the first fingerprint image, acquiring a second fingerprint image at an area proximate a second location of contact on the touch-sensitive surface, determining a difference between a characteristic of the second fingerprint image and the first fingerprint image, and performing a second authentication process based upon whether the difference between the characteristic of the second fingerprint image and the characteristic of the first fingerprint image is greater than a threshold.

In some aspects, an apparatus that authenticates may comprise means for acquiring a first fingerprint image and a second fingerprint image, means for performing an authentication process based on the first fingerprint image, means for determining a difference between a characteristic of the second fingerprint image and the first fingerprint image, and means for performing a second authentication process based upon whether the difference between the characteristic of the second fingerprint image and the characteristic of the first fingerprint image is greater than a threshold.

In some aspects, a non-transitory computer readable medium, may store software, the software including instructions that when executed by one or more processors cause a device to perform one or more operations comprising: acquiring a first fingerprint image at an area proximate a first location of contact on a touch-sensitive surface, performing an authentication process based on the first fingerprint image, acquiring a second fingerprint image at an area proximate a second location of contact on a touch-sensitive surface, determining a difference between a characteristic of the second fingerprint image and the first fingerprint image, and performing a second authentication process based upon whether the difference between the characteristic of the second fingerprint image and the characteristic of the first fingerprint image is greater than a threshold.

The touch-sensitive surface, fingerprint sensor, and/or one or more processors may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

The touch-sensitive surface and fingerprint sensor may be integrated into a single sensor capable of sensing both fingerprint images and touches, and simultaneously or substantially simultaneously measuring both fingerprint images and location of one or more touches.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

As described herein, a "touchscreen", "touch-sensor" and "touch-sensitive surface" may be used alternatively and interchangeably. A touch-sensitive surface may or may not be positioned proximate a display device.

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

In some implementations, method for authentication may include, after a user touches a touch-sensitive surface of a device, acquiring a first fingerprint image at an area proximate the location of touch. A touch-sensitive surface may be a surface which is sensitive to a physical touch by way of conventional touch-sensing methods, including capacitive, resistive, optical, or ultrasound. The sensor which senses the touch in a touch-sensitive surface may reside on the surface, within the surface, or below the surface. The location may be determined on the basis of a centroid of touch, an initial touch location, or any other geometric method of determining touch location. The area may be proximate the location of touch, and may be the shape of a circle, a square, a rectangle, or any arbitrary shape. The area may also be determined by the area of the skin of a finger that is in contact with the touch-sensitive surface. The area may be enlarged beyond, or shrunken to be a smaller size than the area of the skin of a finger that is in contact with the touch-sensitive surface. The area may be a contour that outlines an area of interest within or proximate an area of contact of the finger with the touch-sensitive surface.

A first fingerprint image may be acquired by a fingerprint sensor. Such fingerprint sensor may operate on the principles of optics, capacitance, ultrasound, or any other techniques capable of acquiring a fingerprint image. The fingerprint image may then be stored in a memory in, for example, a processor cache, memory residing in the fingerprint sensor, memory residing in a controller, or memory residing in or operably connected to any of the one or more processors in a device.

An authentication process may be performed on a fingerprint image, such as the first fingerprint image, by any algorithm for fingerprint authentication known in the art, for example, by comparing features extracted from the fingerprint image to a database of known fingerprints. Such a database may reside on the device, on another local device, or on any remote device.

A difference between a characteristic of a first and a characteristic of a second fingerprint image may be determined by a processor or digital signal processor (DSP) residing in, or configured as, a fingerprint sensor, a controller, a general-purpose processor, an apps processor, a processor that also processes touch, a graphics processor, or any circuit within a device capable of processing image data.

Figure 1:
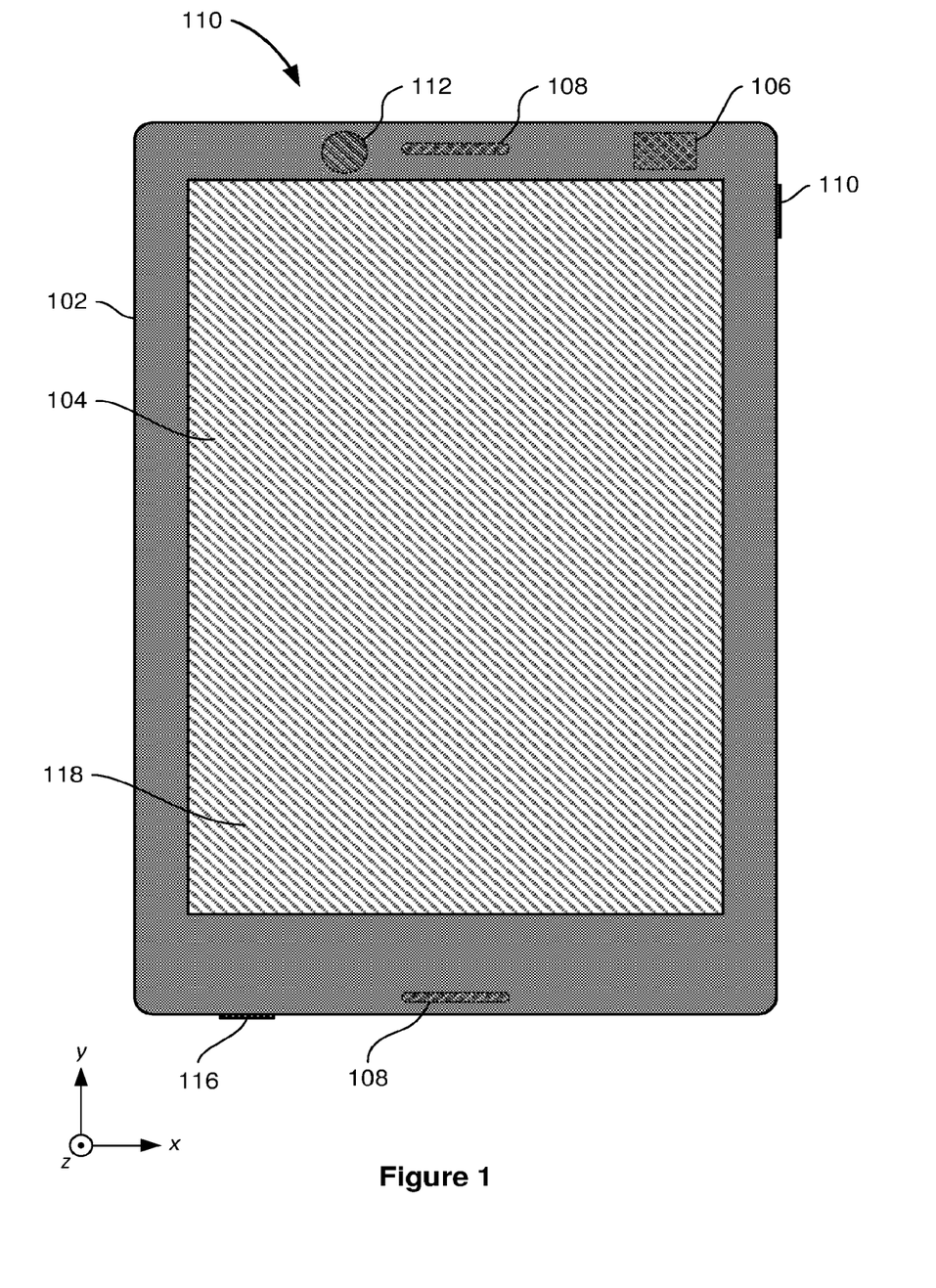
FIG. 1 shows a front view of a diagrammatic representation of an example device that includes a touch-sensor and a fingerprint sensor, according to some implementations.

FIG. 1 shows a diagrammatic representation of an example mobile device 100 that includes a fingerprint sensing system according to some implementations. The mobile device 100 may be representative of, for example, various portable computing devices such as cellular phones, smartphones, smart watches, multimedia devices, personal gaming devices, tablet computers and laptop computers, among other types of portable computing devices. However, various implementations described herein are not limited in application to portable computing devices. Indeed, various techniques and principles disclosed herein may be applied in traditionally non-portable devices and systems, such as in computer monitors, television displays, kiosks, vehicle navigation devices and audio systems, among other applications. Additionally, various implementations described herein are not limited in application to devices that include displays.

The mobile device 100 generally includes an enclosure (also referred to as a "housing" or a "case") 102 within which various circuits, sensors and other electrical components reside. In the illustrated example implementation, the mobile device 100 also includes a touchscreen display (also referred to herein as a "touch-sensitive display") 104. The touchscreen display 104 generally includes a display and a touchscreen arranged over or otherwise incorporated into or integrated with the display. The display 104 may generally be representative of any of a variety of suitable display types that employ any of a variety of suitable display technologies. For example, the display 104 may be a digital micro-shutter (DMS)-based display, a light-emitting diode (LED) display, an organic LED (OLED) display, a liquid crystal display (LCD), an LCD display that uses LEDs as backlights, a plasma display, an interferometric modulator (IMOD)-based display, or another type of display suitable for use in conjunction with touch-sensitive user interface (UI) systems.

The mobile device 100 may include various other devices or components for interacting with or otherwise communicating information to or receiving information from a user. For example, the mobile device 100 may include one or more microphones 106, one or more speakers 108, and in some cases one or more at least partially mechanical buttons 110. The mobile device 100 may include various other components enabling additional features such as, for example, one or more video or still-image cameras 112, one or more wireless network interfaces (not shown) (for example, Bluetooth, WiFi or cellular) and one or more non-wireless interfaces 116 (for example, a universal serial bus (USB) interface or an HDMI interface).

The mobile device 100 may include an fingerprint sensing system 118 capable of scanning and imaging an object signature, such as a fingerprint, palm print or handprint. In some implementations, the fingerprint sensing system 118 may function as a touch-sensitive control button. In some implementations, a touch-sensitive control button may be implemented with a mechanical or electrical pressure-sensitive system that is positioned under or otherwise integrated with the fingerprint sensing system 118. In other words, in some implementations, a region occupied by the fingerprint sensing system 118 may function both as a user input button to control the mobile device 100 as well as a fingerprint sensor to enable security features such as user authentication features. In some implementations, the fingerprint sensing system 118 may be positioned under the cover glass of the display or under a portion of the display itself. In some implementations, the fingerprint sensing system 118 may be positioned on a sidewall or on the backside of the mobile device enclosure 102. The enclosure 102 may house a fingerprint sensor as part of the fingerprint sensing system 118 that is configurable to operate in either a touch-sensing mode or a fingerprint-sensing mode.

Figure 2A:
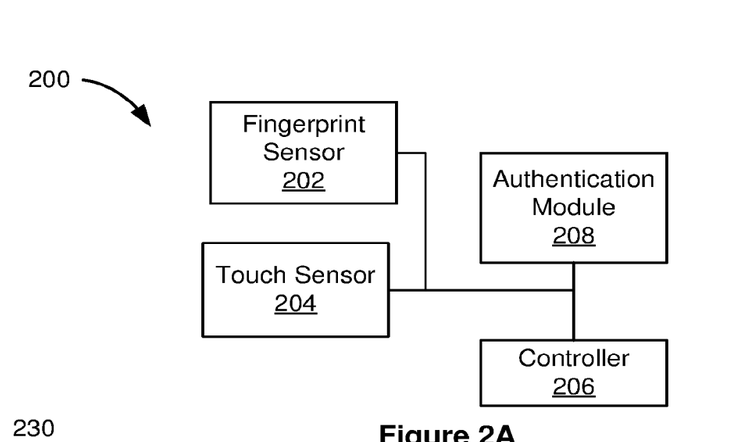
FIG. 2A shows a block diagram representation of components of an example fingerprint authentication system, according to some implementations.

FIG. 2A shows a block diagram representation of a device for authenticating a fingerprint. A fingerprint sensor 202 is operably connected to a touch sensor 204, an authentication module 208, and a controller 206. The fingerprint sensor 202 and touch sensor 204 may be integrated into a block which performs both the function of fingerprint sensing and touch sensing. The authentication module 208 and controller 206 may be integrated into a block which performs both the function of authentication and control. The authentication module 208 and controller 206 may also be integrated into a general-purpose processor of a device, or in one or more of any processors residing in a device.

The fingerprint sensor 202 may produce an image, or data representative of an image, by any means of capturing and converting a fingerprint into an image or image data. The authentication module 208 may receive a fingerprint image or fingerprint image data from the fingerprint sensor. Such fingerprint image data may comprise features extracted from the fingerprint. The authentication module 208 may perform an authentication process by any method for fingerprint authentication known in the art, such as by comparing features extracted from a fingerprint image to a database of fingerprint features associated with an authorized user. The authentication module 208 may perform the authentication process on received raw image data, received filtered or pre-processed image data, or received feature data. The authentication module 208 may also filter or pre-process a received image or image data, and extract features from said image or data.

A controller 206 may be operably connected to the fingerprint sensor 202, touch sensor 204, and authentication module 208 in order to control the configuration, power mode, security level, or other aspects of the fingerprint sensor 202, touch sensor 204, and authentication module 208.

Figure 2B:
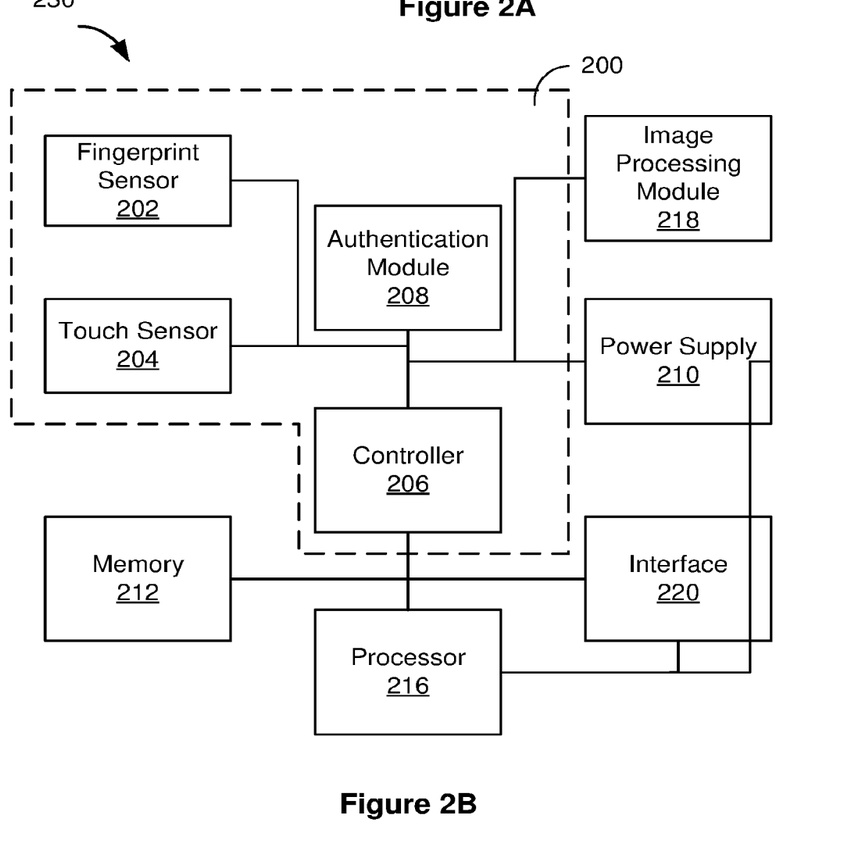
FIG. 2B shows a block diagram representation of components of an example fingerprint authentication system shown incorporated with the components of a mobile device, according to some implementations.

FIG. 2B shows a fingerprint sensing system 200 incorporated into a mobile device 230. A mobile device 230 may also contain, for example, a power supply 210, an image processing module 218, a processor 216, and a memory 212.

FIG. 2B shows a block diagram representation of components of an example mobile device 230 that includes the fingerprint sensing system 200 of FIG. 2A. For example, the mobile device 230 may be a block diagram representation of the mobile device 100 shown in and described with reference to FIG. 1 above. While the controller 206 is shown and described as a single component, in some implementations, the controller 206 may collectively refer to two or more distinct control units or processing units in electrical communication with one another. In some implementations, the controller 206 may include one or more of a general purpose single- or multi-chip processor, a central processing unit (CPU), a digital signal processor (DSP), an applications processor, an application specific integrated circuit (ASIC), a field programmable gate array (FPGA) or other programmable logic device (PLD), discrete gate or transistor logic, discrete hardware components, or any combination thereof designed to perform the functions and operations described herein.

The fingerprint sensing system 200 of FIG. 2B may include an image processing module 218. In some implementations, raw measured image data provided by the fingerprint sensor 202 may be sent, transmitted, communicated or otherwise provided to the image processing module 218. The image processing module 218 may include any suitable combination of hardware, firmware and software configured, adapted or otherwise operable to process the image data provided by the fingerprint sensor 202. In some implementations, the image processing module 218 may include signal or image processing circuits or circuit components including, for example, amplifiers (such as instrumentation amplifiers or buffer amplifiers), analog or digital mixers or multipliers, switches, analog-to-digital converters (ADCs), passive filters or active analog filters, among others. In some implementations, one or more of such circuits or circuit components may be integrated within the controller 206, for example, where the controller 206 is implemented as a system-on-chip (SoC) or system-in-package (SIP). In some implementations, one or more of such circuits or circuit components may be integrated within a DSP included within or coupled to the controller 206. In some implementations, the image processing module 218 may be implemented at least partially via software. For example, one or more functions of, or operations performed by, one or more of the circuits or circuit components just described may instead be performed by one or more software modules executing, for example, in a processing unit of the controller 206 (such as in a general-purpose processor or a DSP). In some implementations, the image processing module 218 or portions thereof may be implemented in software that may run on an applications processor such as processor 216 associated with the mobile device 230. The applications processor may have a dedicated coprocessor and/or software modules for secure processing of the biometric image data within the applications processor (sometimes referred to as the "trust zone").

In some implementations, in addition to the fingerprint sensing system 200, the mobile device 230 may include a separate processor 216, a memory 212, an interface 220 and a power supply 210. In some implementations, the controller 206 of the fingerprint sensing system 200 may control the fingerprint sensor 202 and the image processing module 218, and the processor 216 of the mobile device 230 may control other components of the mobile device 230. In some implementations, the processor 216 communicates data to the controller 206 including, for example, instructions or commands. In some such implementations, the controller 206 may communicate data to the processor 216 including, for example, raw or processed image data (also referred to as "image information"). It should also be understood that, in some other implementations, the functionality of the controller 206 may be implemented entirely, or at least partially, by the processor 216. In some such implementations, a separate controller 206 for the fingerprint sensing system 200 may not be required because the functions of the controller 206 may be performed by the processor 216 of the mobile device 230.

Depending on the implementation, one or both of controller 206 and processor 216 may store data in the memory 212. For example, the data stored in the memory 212 may include raw measured image data, filtered or otherwise processed image data, estimated image data, or final refined image data. The memory 212 may store processor-executable code or other executable computer-readable instructions capable of execution by one or both of controller 206 and the processor 216 to perform various operations (or to cause other components such as the fingerprint sensor 202, the image processing module 218, or other modules to perform operations), including any of the calculations, computations, estimations or other determinations described herein. It should also be understood that the memory 212 may collectively refer to one or more memory devices (or "components"). For example, depending on the implementation, the controller 206 may have access to and store data in a different memory device than the processor 216. In some implementations, one or more of the memory components may be implemented as a NOR- or NAND-based flash memory array. In some other implementations, one or more of the memory components may be implemented as a different type of non-volatile memory. Additionally, in some implementations, one or more of the memory components may include a volatile memory array such as, for example, a type of RAM.

In some implementations, the controller 206 or the processor 216 may communicate data stored in the memory 212 or data received directly from the image processing module 218 through an interface 220. For example, such communicated data can include image data or data derived or otherwise determined from image data. The interface 220 may collectively refer to one or more interfaces of one or more various types. In some implementations, the interface 220 may include a memory interface for receiving data from or storing data to an external memory such as a removable memory device. Additionally or alternatively, the interface 220 may include one or more wireless network interfaces or one or more wired network interfaces enabling the transfer of raw or processed data to, as well as the reception of data from, an external computing device, system or server.

A power supply 210 may provide power to some or all of the components in the mobile device 230. The power supply 210 may include one or more of a variety of energy storage devices. For example, the power supply 210 may include a rechargeable battery, such as a nickel-cadmium battery or a lithium-ion battery. Additionally or alternatively, the power supply 210 may include one or more supercapacitors. In some implementations, the power supply 210 may be chargeable (or "rechargeable") using power accessed from, for example, a wall socket (or "outlet") or a photovoltaic device (or "solar cell" or "solar cell array") integrated with the mobile device 230. Additionally or alternatively, the power supply 210 may be wirelessly chargeable. The power supply 210 may include a power management integrated circuit and a power management system.

As used hereinafter, the term "processing unit" refers to any combination of one or more of a controller of a fingerprint-sensing system (for example, the controller 206), an image processing module (for example, the image processing module 218), or a separate processor of a device that includes the fingerprint-sensing system (for example, the processor 216). In other words, operations that are described below as being performed by or using a processing unit may be performed by one or more of a controller of the fingerprint-sensing system, an image processing module, or a separate processor of a device that includes the fingerprint-sensing system.

Figure 3:
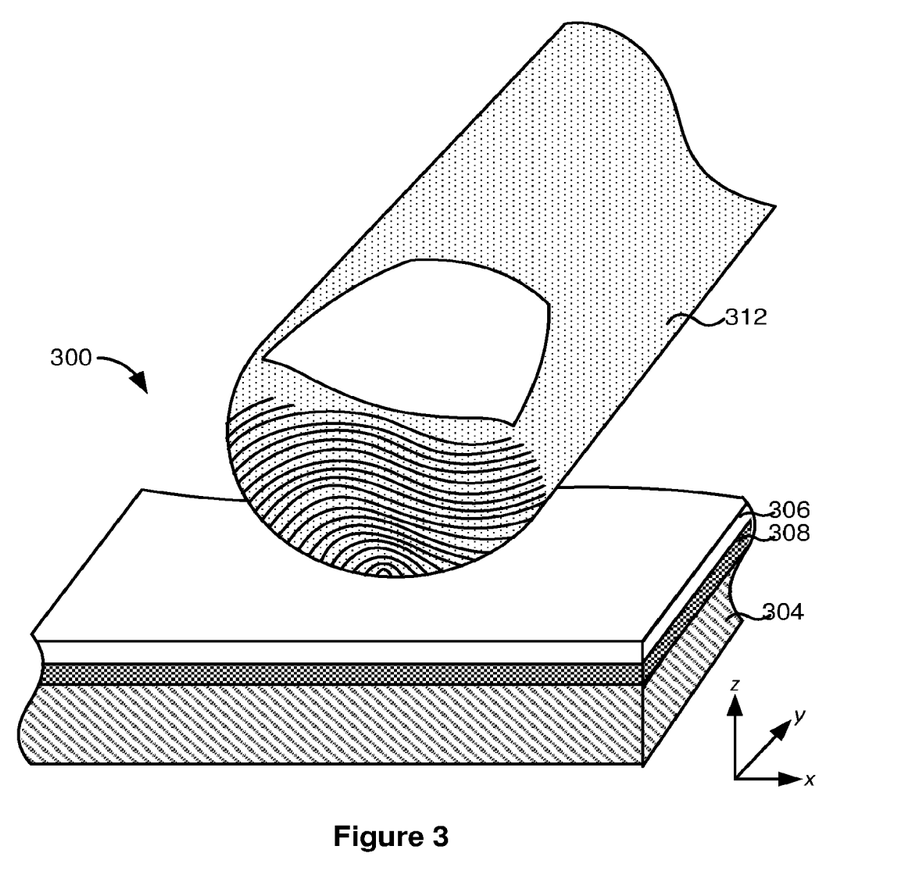
FIG. 3 shows a diagrammatic representation of a finger contacting a touch-sensor with an incorporated fingerprint sensor, according to some implementations.

FIG. 3 shows a cross-sectional projection view of a diagrammatic representation of a portion of an example fingerprint sensing system 300 according to some implementations. For example, the fingerprint sensing system 300 may implement the fingerprint sensing system 200 described with reference to FIG. 2A and FIG. 2B. The fingerprint sensing system 300 may include fingerprint sensing layer 308 that overlies a substrate or display 304 and that underlies a platen (e.g., a "cover plate" or "cover glass") 306. Alternatively, the fingerprint sensing layer 308 may underlie a substrate or display 304 (not shown). Alternatively, the fingerprint sensing layer 308 may be integrated with the substrate or display 304.

In some implementations, the display 304 may be positioned between the platen 306 and the fingerprint sensing layer 308. In some implementations, the display 304 may serve as the platen 306. One or more protective layers, acoustic matching layers, anti-smudge layers, adhesive layers, decorative layers, conductive layers or other coating layers (not shown) may be included on one or more sides of the display 304, the fingerprint sensing layer 308, and the platen 306.

The platen 306 may be formed of any suitable material that may be operably coupled to the fingerprint sensing layer 308. For example, the platen 306 may be formed of one or more of glass, plastic, ceramic, sapphire, metal or metal alloy. In some implementations, the platen 306 may be a cover plate such as, for example, a cover glass or a lens glass of an underlying display. In some implementations, the platen 306 may include one or more polymers, such as one or more types of parylene, and may be substantially thinner. In some implementations, the platen 306 may have a thickness in the range of about 10 microns (μm) to about 1000 μm or more.

Figure 4A:
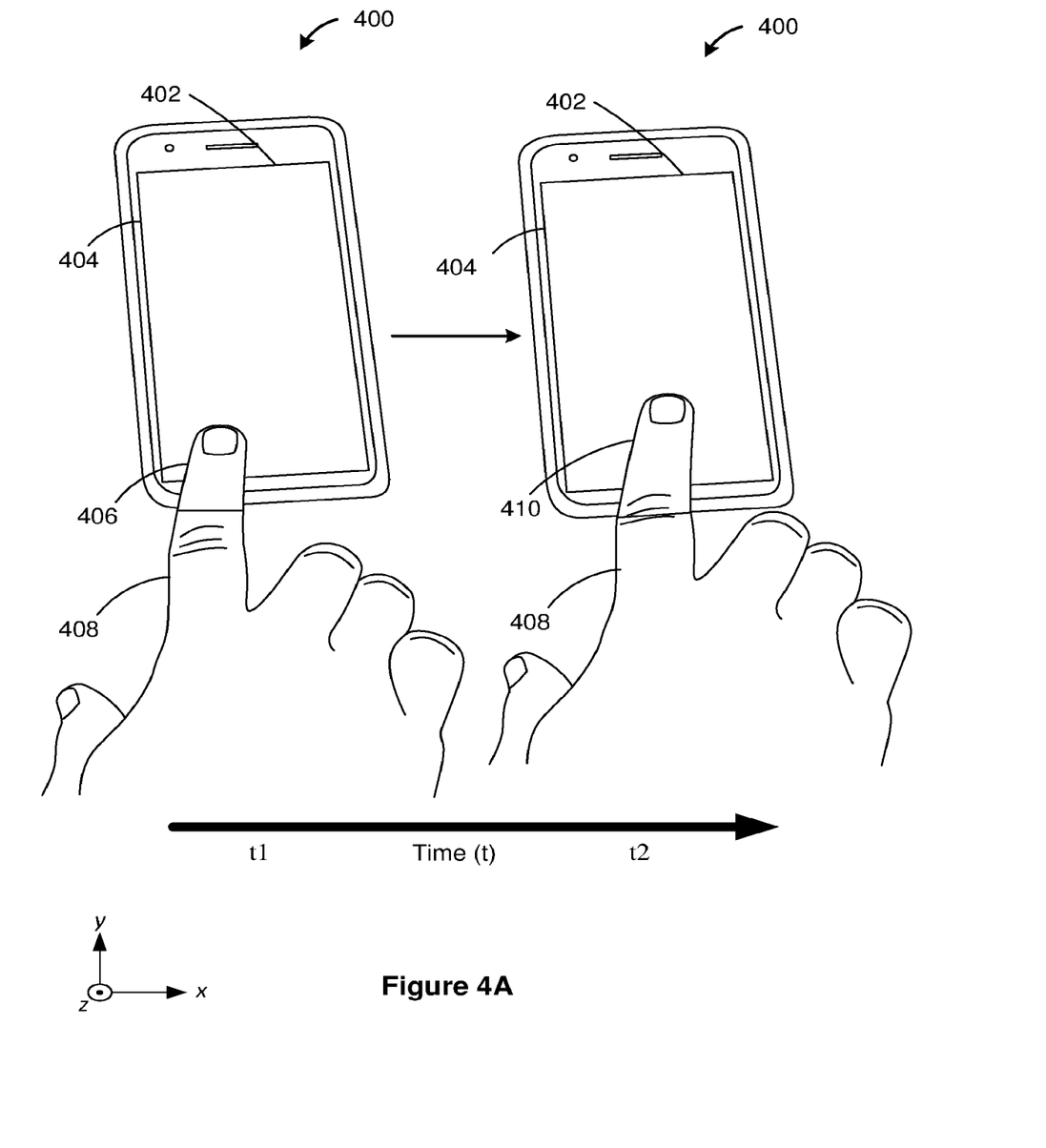
FIG. 4A shows a diagrammatic representation of a finger contacting a touch-sensitive surface and swiping from left to right, according to some implementations.

FIG. 4A shows an example implementation of a device 400, which includes a fingerprint sensing system 404, which may authenticate a fingerprint based upon a first fingerprint image from a first contact proximate a first area 406, then may acquire a second fingerprint image after a user swipes his/her finger on a touch-sensitive surface 402.

Proximate time t1, a user places his/her finger 408 at a first contact proximate a first area 406. A device 400 may acquire a first fingerprint image at an area proximate the first contact proximate a first area 406 and may perform an authentication process on the fingerprint image to ensure that the fingerprint belongs to an authorized user. The authentication process may also ensure that the fingerprint does not belong to a user who has been placed on a blacklist specifically for unauthorized users.

Proximate time t2, a user has swiped his/her finger 408 from a first contact proximate a first area 406 to a second location of contact 410. A device 400 may acquire a second fingerprint image at an area proximate the second location of contact 410. A device 400 may determine a difference between one or more characteristics of the second fingerprint image and the first fingerprint image, and perform a second authentication process if the one or more characteristics exceeds a threshold.

In this example shown, where the same user has merely swiped his/her finger from a first contact proximate a first area 406 of the touch-sensitive surface to a second location of contact 410, a difference between one or more characteristics of the second fingerprint image and the first fingerprint image may be lower than a threshold, thereby the device 400 does not need to perform a second authentication process, as there is sufficient certainty that the same authenticated user is still interfacing with the device 400.

Figure 4B:
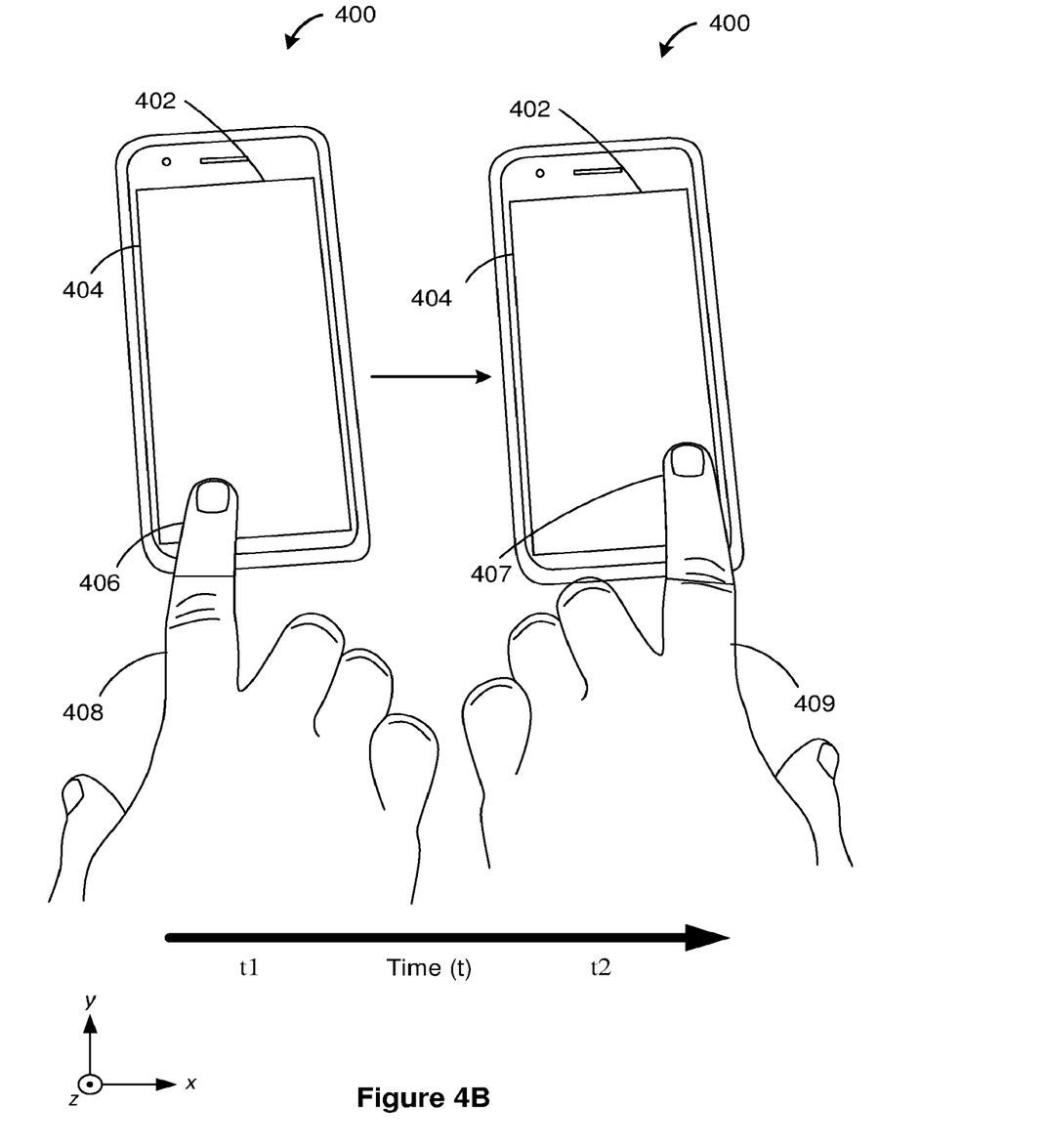
FIG. 4B shows a diagrammatic representation of one finger contacting a touch-sensitive surface and, later in time, another finger contacting the touch-sensitive surface, according to some implementations.

FIG. 4B shows an example implementation of a device 400, which includes a fingerprint sensing system 404, which may authenticate a fingerprint based upon a first fingerprint image from a first contact proximate a first area 406, then may acquire a second fingerprint image after a user swipes his/her finger on a touch-sensitive surface 402.

Proximate time t1, a user places his/her finger 408 at a first contact proximate a first area 406. A device 400 may acquire a first fingerprint image at a first contact proximate a first area 406 and may perform an authentication process on the fingerprint image to ensure that the fingerprint belongs to an authorized user. The authentication process may also ensure that the fingerprint does not belong to a user who has been placed on a blacklist specifically for unauthorized users.

Proximate time t2, a user (or a different and potentially unauthorized user) makes contact with a different finger 409 with a second location of contact 407. A device 400 may acquire a second fingerprint image at an area proximate the second location of contact 407. A device 400 may determine a difference between one or more characteristics of the second fingerprint image and the first fingerprint image, and perform a second authentication process if the one or more characteristics exceeds a threshold.

In this example shown in FIG. 4B, where a different finger makes contact with the touch-sensitive surface at a second location of contact 410, a difference between one or more characteristics of the second fingerprint image and the first fingerprint image may be greater than a threshold, as the fingerprint would be different, thereby the device 400 performs a second authentication process, as there is sufficient certainty that an unauthenticated user or finger is interfacing with the device 400.

A characteristic of a fingerprint image may change, from one image to a successive image, based upon a number of factors. For example, a user may roll his/her finger to the side, or use a different portion of the finger to touch the touch-sensitive surface, or apply more force to the touch-sensitive surface. The authentication module 208 and image processing module 218 may account for this by applying image transformations to the second fingerprint image in order to minimize the difference in one or more characteristics from multiple images of the same finger.

Figure 5:
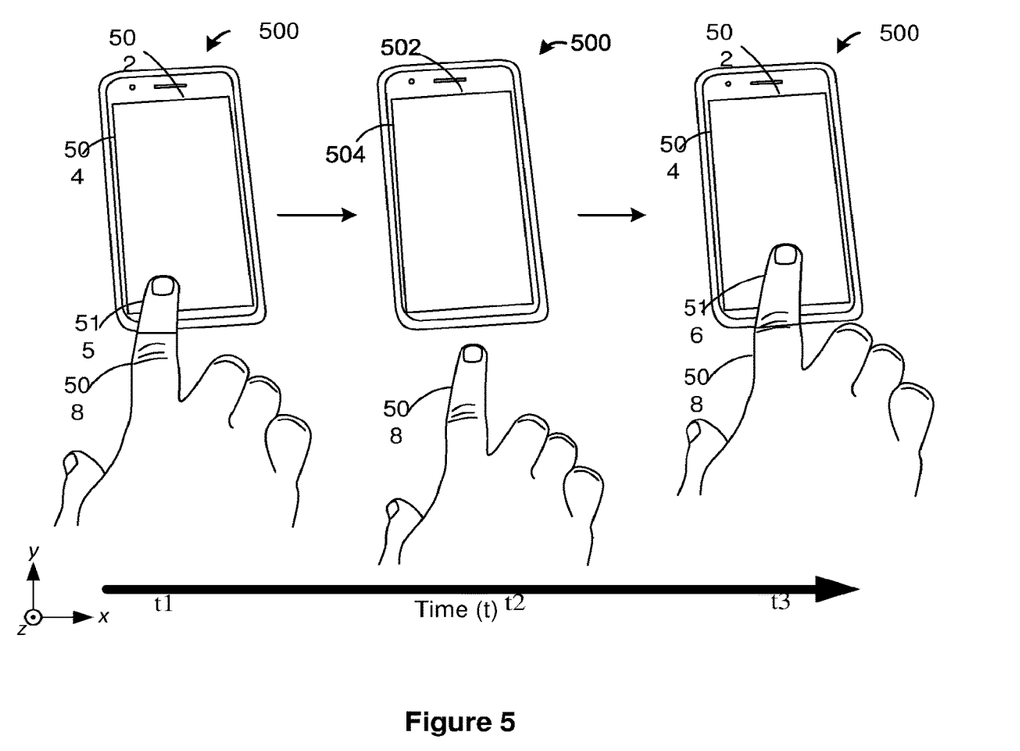
FIG. 5 shows a diagrammatic representation of a finger contacting a touch-sensitive surface, later in time ceasing contact with the touch-sensitive surface, and further later in time resuming contact with the touch-sensitive surface, according to some implementations.

FIG. 5 shows an example implementation of a device 500, which includes a fingerprint sensing system 504, which may authenticate a fingerprint based upon a first fingerprint image from a first contact proximate a first area 515 at time t1, then at a time thereafter, t2, a user may remove their finger from the touch-sensitive surface so that there is no longer a contact, then may acquire a second fingerprint image after a user places their finger again on a touch-sensitive surface 502 at a second contact proximate a second area 516 at time t3. At some time proximate t3, the device 500 may determine a difference between a characteristic of the second fingerprint image and the first fingerprint image, and perform a second authentication process based upon whether the difference between the characteristic of the second fingerprint image and the characteristic of the first image is greater than a threshold.

At some time proximate t1, after a fingerprint sensing system 504 authenticates a fingerprint based upon a first fingerprint image from a first contact proximate a first area 515, the device 500 may be in an unlocked state, or, in other words, a state where a user has been authenticated via their fingerprint and has access to the device at a security level according to their authentication level and/or user account and/or device settings.

At some time proximate t2, where a device 500 has already authenticated a user via their fingerprint the device may remain in the unlocked state until there is some interaction with the device 500. Additionally, the device may enter a locked state if t2 is greater than a threshold beyond t2.

At some time proximate t3, when a finger 508 contacts the touch-sensitive surface 502, the fingerprint sensing system 504 may then may acquire a second fingerprint image after a user places their finger again on a touch-sensitive surface 502 at a second contact proximate a second area 516 at time t3. At some time proximate t3, the device 500 may determine a difference between a characteristic of the second fingerprint image and the first fingerprint image, and perform a second authentication process based upon whether the difference between the characteristic of the second fingerprint image and the first image is greater than a threshold. The characteristic may be any one of a time of contact, a prior cessation of contact, a location of contact, an area of contact, a size of a contact, or other aspects. For example, by a determination that there has been a cessation of contact for an amount of time in between the first contact proximate a first area 515 and a second contact proximate a second area 516, wherein the amount of time is greater than a threshold, the device 500 may perform a second authentication process. By way of another example, by a determination that t3 is greater than t1 by more than a threshold, the device 500 may perform a second authentication process. The second authentication process may, for example, be performed upon the second fingerprint image, or a fingerprint image taken thereafter.

The aforementioned characteristic may also be an energy level of an image, an energy distribution of an image, a variance of an image, contours of an image, a timestamp of an image, or a correlation between images.

The aforementioned threshold may also be based upon a security level. For example, at a lower security level, a greater threshold may be acceptable, wherein a greater difference between images does not entail requiring a second authentication process. This may, however, increase the false acceptance rate, which may be acceptable in a lower-security level. For example, at a higher security level, a lesser threshold may be required, wherein a lesser difference between images is used to determine whether a second authentication process may be required. This may, however, increase the false rejection rate, which may be acceptable in a higher-security level.

After a successful authentication, the device 500 may remain in the unlocked state, or, in case of an unsuccessful authentication, the device 500 may transition to a locked state, or may provide a notification to a user to authenticate again or through a different method.

Figure 6:
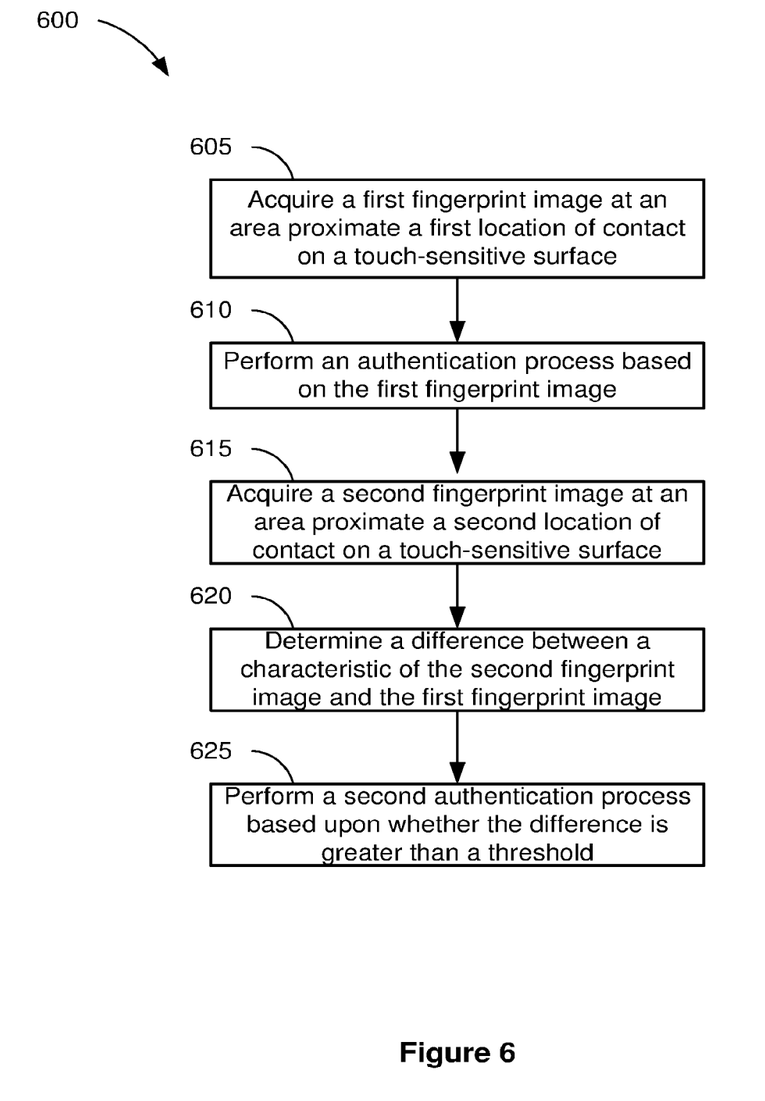
FIG. 6 shows an example of an authentication process, according to some implementations.

FIG. 6 shows block diagram representation of an example implementation of a process 600 for authenticating. At block 605, a first fingerprint image is acquired at an area proximate a first location of contact on a touch-sensitive surface. At block 610, an authentication process is performed based upon the first fingerprint image. At block 615, a second fingerprint image is acquired at an area proximate a second location of contact on the touch-sensitive surface. At block 620, a difference is determined between a characteristic of the second fingerprint image and the first fingerprint image. At block 625, based upon whether the difference between a characteristic of the second fingerprint image and the first fingerprint image is greater than a threshold, a second authentication process is performed.

The second authentication process performed at block 625 may, for example, performed upon the second fingerprint image or one taken thereafter. There may be some delay time in between the acquisition of the second fingerprint image, the determination of a difference between a characteristic of the first fingerprint image and second fingerprint image, and the second authentication process. Therefore, the second authentication process may be performed based upon an image other than the second fingerprint image.

If, for example, it is determined that the second fingerprint image is of low quality, or the security level does not require an immediate reauthentication, a time delay may happen before the second authentication process is performed. For some lower security levels, it may be advantageous to not risk a false-rejection of a fingerprint based upon a low-quality image.

Figure 7:
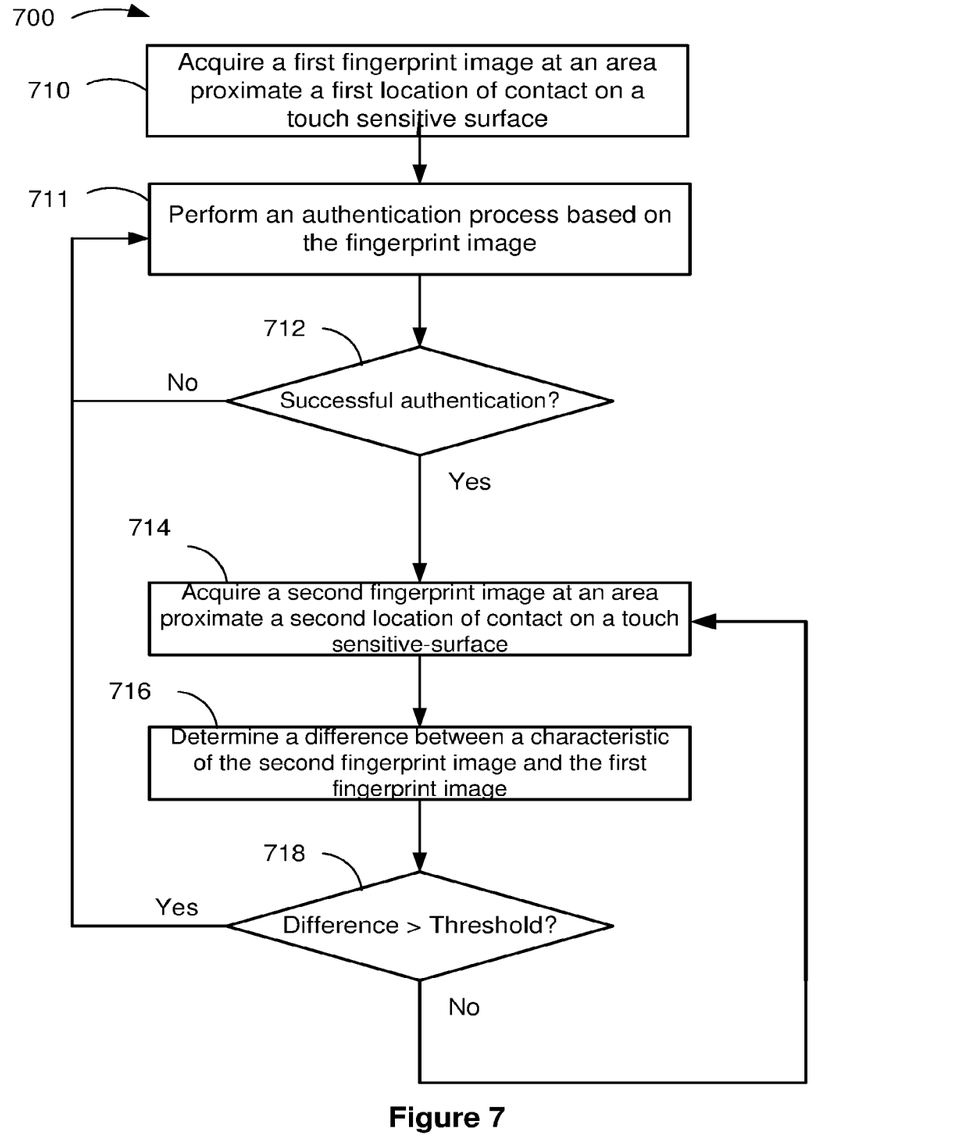
FIG. 7 shows an example of an authentication process, according to some implementations.

FIG. 7 shows a flow diagram representation of an example implementation 700 of an authentication process.

At block 710, a first fingerprint image at an area proximate a first location of contact on a touch sensitive surface is acquired. At block 711 an authentication is performed based upon a fingerprint image, such as the first fingerprint image. At determination point 712, if there is not an successful authentication, this may represent where a device remains locked, and the device returns to block 710 in order to wait until an image is acquired which is successfully authenticated. At determination point 712, after there is a successful authentication, this may represent where a user's fingerprint is authenticated and a device is unlocked, and a second fingerprint image at an area proximate a second location of contact on a touch-sensitive surface is acquired at block 714, then at block 716 a determination is made of a difference between a characteristic of the second fingerprint image and the first fingerprint image, and at block 718 a determination is made of whether the difference is greater than a threshold.

If the difference is greater than a threshold, then this may be because the second fingerprint image represents the finger of an unauthorized user, and the device returns to a locked mode, and returns to block 710 to await authentication of a first fingerprint image. If the difference is not greater than a threshold, then this may be because the second fingerprint image represents the finger of an authorized user, therefore no further authentication process needs to be performed.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A method for authenticating, the method comprising:
   acquiring first fingerprint image data from a touch-sensitive surface;
   performing a first authentication process based on the first fingerprint image data, wherein the first authentication process is performed by comparing features extracted from the first fingerprint image to a database of known fingerprints;
   acquiring second fingerprint image data;
   determining a difference between a characteristic of the second fingerprint image data and a characteristic of the first fingerprint image data; and
   performing a second authentication process based upon the difference between the characteristic of the second fingerprint image data and the characteristic of the first fingerprint image data wherein the second authentication process is performed upon the second fingerprint image, or a fingerprint image taken thereafter.

2. The method of claim 1, wherein the characteristic of the second fingerprint image data and the characteristic of the first fingerprint image data is a two-dimensional location.

3. The method of claim 1, wherein the characteristic of the second fingerprint image data and the characteristic of the first fingerprint image data is an energy level.

4. The method of claim 1, wherein the characteristic of the second fingerprint image data and the characteristic of the first fingerprint image data is a timestamp.

5. The method of claim 1, wherein the difference between a characteristic of the second fingerprint image data and the characteristic of the first fingerprint image data comprises the output of a correlation function.

6. The method of claim 1, further comprising: determining the characteristic of the second fingerprint image data and the characteristic of the first fingerprint image data, from among a set of characteristics, based upon a security level.

7. The method of claim 1, further comprising: determining whether there has been a cessation of contact with a surface of a device configured to perform the method.

8. An apparatus for authenticating, the apparatus comprising:
- a fingerprint sensor configured to acquire:
- first fingerprint image data and second fingerprint image data from a touch-sensitive surface;
- one or more processors coupled to the fingerprint sensor and configured to:
  - perform a first authentication process based on the first fingerprint image data, wherein the first authentication process is performed by comparing features extracted from the first fingerprint image to a database of known fingerprints;
  - determine a difference between a characteristic of the second fingerprint image data and a characteristic of the first fingerprint image data; and
  - perform a second authentication process based upon the difference between the characteristic of the second fingerprint image data and the characteristic of the first fingerprint image data wherein the second authentication process is performed upon the second fingerprint image, or a fingerprint image taken thereafter.

9. The apparatus of claim 8, wherein the characteristic of the second fingerprint image data and the characteristic of the first fingerprint image data is a two-dimensional location.

10. The apparatus of claim 8, wherein the characteristic of the second fingerprint image data and the characteristic of the first fingerprint image data is an energy level.

11. The apparatus of claim 8, wherein the characteristic of the second fingerprint image data and the characteristic of the first fingerprint image data is a timestamp.

12. The apparatus of claim 8, wherein the difference between a characteristic of the second fingerprint image data and the characteristic of the first fingerprint image data is based upon a correlation function.

13. The apparatus of claim 8, wherein the one or more processors are further configured to: determine the characteristic of the second fingerprint image data and the characteristic of the first fingerprint image data, from among a set of characteristics, based upon a security level.

14. The apparatus of claim 8, wherein the one or more processors are further configured to: determine whether there has been a cessation of contact with a surface coupled to the fingerprint sensor.

15. An apparatus for authenticating, the apparatus comprising:
- means for acquiring first fingerprint image data and second fingerprint image data from a touch-sensitive surface;
- means for performing an authentication process based on the first fingerprint image data, wherein the first authentication process is performed by comparing features extracted from the first fingerprint image to a database of known fingerprints;
- means for determining a difference between a characteristic of the second fingerprint image data and a characteristic of the first fingerprint image data; and
- means for performing a second authentication process based upon the difference between the characteristic of the second fingerprint image data and the characteristic of the first fingerprint image data wherein the second authentication process is performed upon the second fingerprint image, or a fingerprint image taken thereafter.

16. The apparatus of claim 15, wherein the characteristic of the second fingerprint image data and the characteristic of the first fingerprint image data is a two-dimensional location.

17. The apparatus of claim 15, wherein the characteristic of the second fingerprint image data and the characteristic of the first fingerprint image data is an energy level.

18. The apparatus of claim 15, wherein the characteristic of the second fingerprint image data and the characteristic of the first fingerprint image data is a timestamp.

19. The apparatus of claim 15, wherein the difference between a characteristic of the second fingerprint image data and the characteristic of the first fingerprint image data is based upon a correlation function.

20. The apparatus of claim 15, further comprising: means for determining the characteristic of the second fingerprint image data and the characteristic of the first fingerprint image data, from among a set of characteristics, based upon a security level.

21. The apparatus of claim 15, further comprising: means for determining whether there has been a cessation of contact with a surface of the apparatus.

22. A non-transitory computer readable medium, having software stored thereon, the software including instructions that when executed by one or more processors cause a device to perform one or more operations comprising:
- acquiring first fingerprint image data from a touch-sensitive surface;
- performing an authentication process based on the first fingerprint image data, wherein the first authentication process is performed by comparing features extracted from the first fingerprint image to a database of known fingerprints;
- acquiring second fingerprint image data;
- determining a difference between a characteristic of the second fingerprint image data and a characteristic of the first fingerprint image data; and
- performing a second authentication process based upon the difference between the characteristic of the second fingerprint image data and the characteristic of the first fingerprint image data wherein the second authentication process is performed upon the second fingerprint image, or a fingerprint image taken thereafter.

23. The non-transitory computer readable medium of claim 22, wherein the one or more operations further comprises:
- determining whether there has been a cessation of contact with a surface of the device.

* * * * *